(12) United States Patent
Takehisa et al.

(10) Patent No.: US 6,560,269 B1
(45) Date of Patent: May 6, 2003

(54) FLUORINE LASER DEVICE

(75) Inventors: Kiwamu Takehisa, Hiratsuka (JP); Tatsuya Ariga, Hiratsuka (JP); Osamu Wakabayashi, Hiratsuka (JP)

(73) Assignee: Komatsu, Ltd., Tokyo (JP)

( * ) Notice: Subject to any disclaimer, the term of this patent is extended or adjusted under 35 U.S.C. 154(b) by 253 days.

(21) Appl. No.: 09/625,969

(22) Filed: Jul. 26, 2000

(51) Int. Cl.⁷ .................................. H01S 3/08
(52) U.S. Cl. .................. 372/103; 372/99; 372/100
(58) Field of Search .................... 372/57, 92, 98, 372/99, 100, 103

(56) References Cited

U.S. PATENT DOCUMENTS 5,084,884 A * 1/1992 Terada ..................... 372/99
5,150,370 A * 9/1992 Furuya et al. ........... 372/100

OTHER PUBLICATIONS

T. J. McKee: Canadian Journal of Physics, vol. 63, pp. 214–219, 1985. "Spectral–narrowing techniques for excimer laser oscillators".

* cited by examiner

Primary Examiner—Minh Loan Tran
(74) Attorney, Agent, or Firm—Armstrong, Westerman & Hattori, LLP.

(57) ABSTRACT

Fluorine laser device capable of obtaining laser light with strong monochromatic property and large power is provided. For this purpose, the fluorine laser device is in a fluorine laser device including a laser chamber (2) in which a laser medium including fluorine is contained and is excited to thereby oscillate laser light (11), a front slit (116) disposed in front of said laser chamber (2) and having a front opening (33) for transmitting the laser light (11), and a rear slit (117) disposed behind said laser chamber (2) and having a rear opening (34) for transmitting the laser light (11), at least one of the front slit (116) and the rear slit (117) is a slit (16; 17) in which a slit inclined plane (35) is formed on a surface at a laser chamber side to make one of the front opening (33) and the rear opening (34) convex.

1 Claim, 16 Drawing Sheets

FLUORINE LASER DEVICE

TECHNICAL FIELD

The present invention relates to a fluorine laser device, and particularly relates to a fluorine laser device in which a band of a wavelength is narrowed by a dispersion prism.

BACKGROUND ART

Band narrowing means for narrowing a band of a wavelength of laser light with use of a dispersion prism is conventionally known, and is shown, for example, in the reference, Canadian Journal of Physics, Vol. 63, PP. 214–219, 1985. FIG. 21 shows a fluorine laser device in which the band of a wavelength is narrowed by using the band narrowing means which is disclosed in the aforementioned reference, and the prior art will be explained below based on FIG. 21.

In FIG. 21, a fluorine laser device 1 includes a laser chamber 2 containing laser gas being a laser medium. High voltage is applied across discharge electrodes not illustrated which are placed inside the laser chamber 2 from a high-voltage power supply not illustrated, and discharge occurs across the discharge electrodes, thereby generating laser light 11.

At both end portions of the laser chamber 2, fixed are a front window 107 and a rear window 109 for transmitting the laser light 11. In front of (right side of FIG. 1) and behind the laser chamber 2, respectively placed are a front slit 116 and a rear slit 117 having a front opening 33 and a rear opening 34 each having a predetermined width.

In front of the front slit 116, placed is a front mirror 8 for transmitting part of the laser light 11 at a predetermined transmissivity to emit it. Further, behind the rear slit 117, disposed are two dispersion prisms 118 and 118, and a rear mirror 106 for totally reflecting the laser light 11 is disposed behind the prisms 118 and 118.

The laser light 11 oscillated inside the laser chamber 2 is transmitted through the rear window 109, and passes through the rear opening 34 and the two prisms 118 and 118. Subsequently, it is reflected at the rear mirror 106, passes through the dispersion prisms 118 and 118 and the rear opening 34 once again, and is transmitted through the rear window 109 to return to the laser chamber 2. The laser light 11 passes through the front window 107 and the front opening 33, and is partly transmitted through the front mirror 8 to be emitted forward.

In this situation, in the laser light 11 oscillated inside the laser chamber 2, high-power intense line light 11A (wavelength 157.6299 nm) and low-power weak line light 11B (wavelength 157.5233 nm) coexist. Since the intense line light 11A and the weak line light 11B have different wavelengths, refraction angles at which they enter and exit the dispersion prisms 118 and 118 differ from each other. As a result, while the intense line light 11A and the weak line light 11B are passing through the two dispersion prisms 118 and 118, optical paths thereof deviate from each other little by little.

The intense line light 11A passes through the rear opening 34 and the front opening 33 and is emitted from the front mirror 8. On the other hand, the weak line light 11B has its optical path deviated while it goes and returns through the two dispersion prisms 118 and 118 and is blocked by either the rear slit 117 or the front slit 116, and as a result it is not oscillated. Thus, only the intense line light 11A is oscillated, thereby narrowing the bandwidth of the wavelength of the laser light 11.

However, the application of the band narrowing means with use of the above dispersion prisms 118 and 118 to the fluorine laser device 1 has the following disadvantages.

Specifically, during discharge to excite the laser medium, a spontaneous emission occurs in every direction from the excited fluorine from the fluorine laser device 1. Of the above spontaneous emissions, those traveling in the same direction as the laser light 11 interact with a number of excited molecules and inductively emit a large quantity of photon. It is known that the spontaneous emissions traveling on approximately the same axis of the laser light 11 are intensified as a result of the above. The intensified spontaneous emission is called an amplified spontaneous emission 36 hereinafter.

As shown in FIG. 21, the amplified spontaneous emission 36, for example, emitted rearward from the laser chamber 2 is hit against the slits 116 and 117 to be reflected since it has a larger broadening angle than the laser light 11. In this situation, it sometimes happens that the amplified spontaneous emission 36 which is hit against the slits 116 and 117 is irregularly reflected and returns into the laser chamber 2. As a result, part of discharge energy for amplifying the laser light 11 is spent to amplify the amplified spontaneous emission 36 once again, thus causing the disadvantage of reducing the power of the laser light 11.

Further, it sometimes happens that the weak line light 11B is irregularly reflected at the slit 16 and returns into the laser chamber 2 as the amplified spontaneous emission 36, and is amplified again by discharge in the laser chamber 2. Thus, the intense line light 11A and the weak line light 11B are mixed in the emitted laser light 11 to reduce the monochromatic property of the laser light 11 and the spectral width of the wavelength is increased. As a result, for example, when the laser light 11 is used for laser machining, there arises the disadvantage of machining accuracy being reduced.

SUMMARY OF THE INVENTION

The present invention is made to eliminate the above disadvantages of the prior art, and its object is to provide a fluorine laser device capable of obtaining high-power laser light with large monochromatic property.

In order to attain the above object, a first configuration of a fluorine laser device according to the present invention is in a fluorine laser device including a laser chamber in which a laser medium including fluorine is contained and is excited to thereby oscillate laser light, a front slit disposed in front of the laser chamber and having a front opening for transmitting the laser light, and a rear slit disposed behind the laser chamber and having a rear opening for transmitting the laser light, at least one of the front slit and the rear slit is a slit in which a slit inclined plane is formed on a surface at a laser chamber side to make one of the front opening and the rear opening convex.

According to the above configuration, amplified spontaneous emission generated inside the laser chamber hits against the slit inclined plane and is reflected in a direction away from the laser chamber, and thus less of it returns into the laser chamber. Accordingly, less of the amplified spontaneous emission is amplified, and the ratio of energy spent for oscillation of the laser light increases, thus increasing the power of the laser light.

Further, in the fluorine laser device, the slit with the slit inclined plane being formed may further have a slit inclined plane formed on a surface at an opposite side to the laser chamber to make one of the front opening and the rear opening convex.

According to the above configuration, weak line light, which is reflected, for example, at the rear mirror and the front mirror and returns in the direction of the laser chamber, hits against the slit inclined plane and is reflected in the direction away from the laser chamber. As a result, less of the weak line light returns into the laser chamber to be amplified again, and only intense line light is amplified and oscillated. Accordingly, the monochromatic property of the laser light is improved, and for example, when the laser light is used for laser machining, machining accuracy is improved. Further, the amplified spontaneous emission reflected, for example, at the rear mirror and the front mirror also hits against the slit inclined plane and is reflected in the direction away from the laser chamber, and thus less of it returns into the laser chamber.

Further, in the fluorine laser device, the slit with the slit inclined plane being formed has black nickel plating applied onto a surface at the laser chamber side.

According to the above configuration, the amplified spontaneous emission and the weak line light generated inside the laser chamber are absorbed by the black nickel plating, and less of them is irregularly reflected and returns into the laser chamber.

A second configuration of the fluorine laser device is in a fluorine laser device including a laser chamber in which a laser medium including fluorine is contained and is excited to thereby oscillate laser light, a front slit disposed in front of the laser chamber and having a front opening for transmitting the laser light, and a rear slit disposed behind the laser chamber and having a rear opening for transmitting the laser light, at least one of the front slit and the rear slit is a slit in which black nickel plating is applied onto a surface at a laser chamber side.

According to the above configuration, the amplified spontaneous emission and the weak line light generated inside the laser chamber are absorbed by the black nickel plating. The amplified spontaneous emission and the weak line light which are not absorbed by the black nickel plating hit against the slit inclined plane and are reflected in the direction away from the laser chamber, and thus further less of them returns into the laser chamber.

A third aspect of a fluorine laser device according to the present invention is in a fluorine laser device including a laser chamber in which a laser medium including fluorine is contained and is excited to thereby oscillate laser light, and a rear mirror disposed behind said laser chamber and reflecting the laser light, the rear mirror is a rear mirror in which a rear mirror total reflection portion for reflecting the laser light at high reflectivity is formed only at a portion to which the laser light is emitted.

According to the above configuration, the laser light is reflected at the rear mirror total reflection portion at high reflectivity and returns into the laser chamber and is amplified. On the other hand, since the amplified spontaneous emission generated in the laser chamber has a larger broadening angle than the laser light, it hits against the portion other than the rear mirror total reflection portion and is, for example, absorbed or reflected in the direction away from the laser chamber. Accordingly, less of the amplified spontaneous emission returns into the laser chamber.

Further in the fluorine laser device, the rear mirror with the rear mirror total reflection portion being formed may have a rear mirror inclined plane formed at an outer perimeter of the rear mirror total reflection portion to make the rear mirror total reflection portion convex.

According to the above configuration, since the amplified spontaneous emission has a larger broadening angle than the laser light, it hits against the rear mirror inclined plane and is reflected in the direction away from the laser chamber. Accordingly, less of the amplified spontaneous emission returns into the laser chamber.

A fourth configuration of a fluorine laser device according to the present invention is in a fluorine laser device including a laser chamber in which a laser medium including fluorine is contained and is excited to thereby oscillate laser light, and dispersion prisms disposed behind the laser chamber and refracting the laser light, the dispersion prisms have prism transmission portions for transmitting the laser light and prism inclined planes formed at outer perimeters of the prism transmission portions to make the prism transmission portions convex.

According to the above configuration, the laser light is transmitted through the prism transmission portions. On the other hand, since the amplified spontaneous emission generated in the laser chamber has a larger broadening angle than the laser light, it hits against the prism inclined planes at the opposite chamber side of the prism transmission portions and is reflected in the direction away from the laser chamber. Accordingly, less of the amplified spontaneous emission returns into the laser chamber.

A fifth configuration of a fluorine laser device according to the present invention is in a fluorine laser device including a laser chamber in which a laser medium including fluorine is contained and is excited to thereby oscillate laser light, and a front window and a rear window respectively disposed at a front and a rear portion of the laser chamber and transmitting the laser light, at least one of the front window and the rear window has a window transmission portion for transmitting the laser light and a window inclined plane formed at an outer perimeter of the window transmission portion to make the window transmission portion convex, on a surface at an opposite side to the laser chamber.

According to the above configuration, the amplified spontaneous emission generated in the laser chamber is reflected at the front mirror and returns in the direction of the laser chamber, and thereafter it hits against the window inclined plane and is reflected in the direction away from the laser chamber. Accordingly, less of the amplified spontaneous emission returns into the laser chamber.

BEST MODE FOR CARRYING OUT THE INVENTION

A preferred embodiment of the present invention will be explained below with reference to the drawings.

Initially, a first embodiment will be explained.

Figure 1:
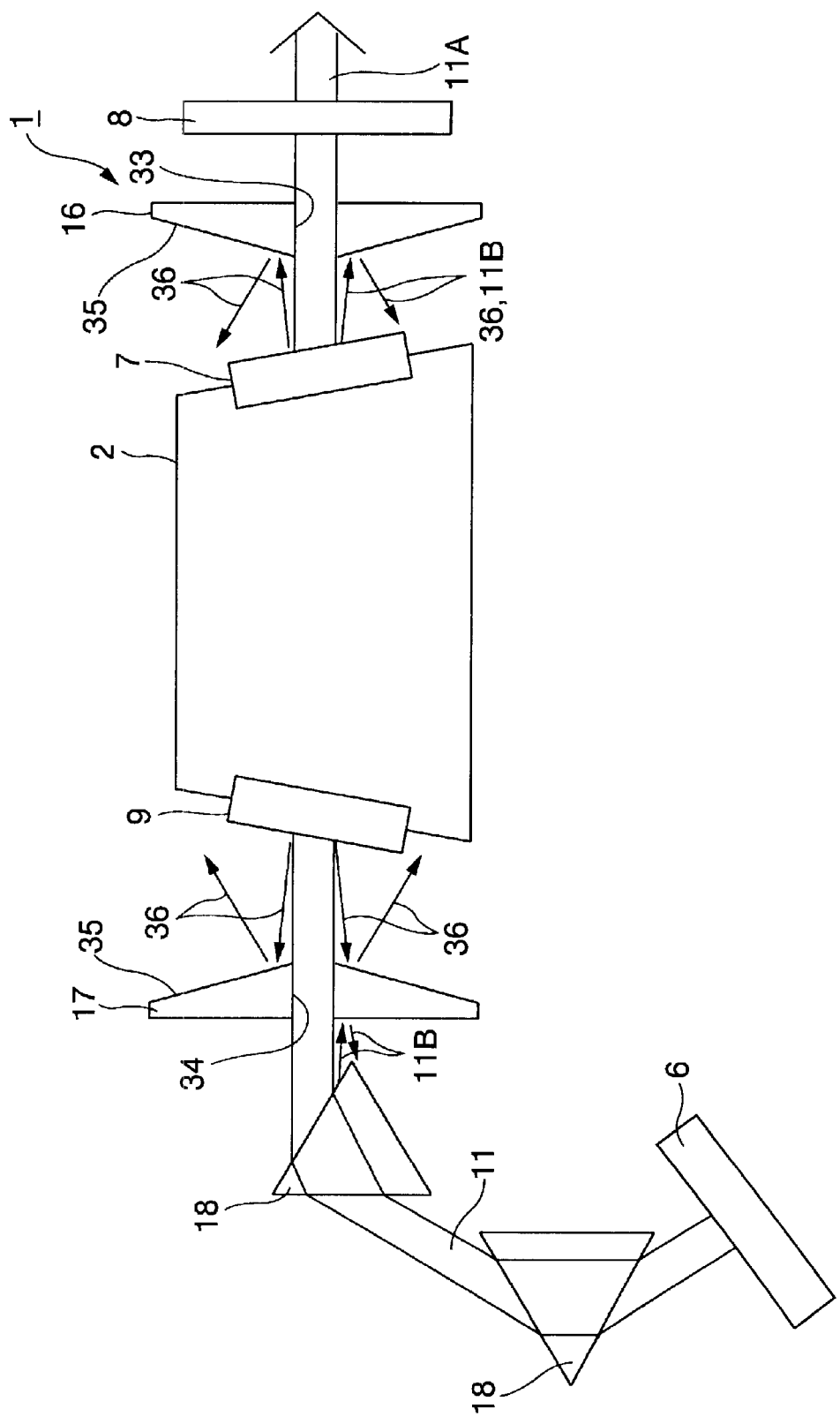
FIG. 1 is an explanatory view showing a configuration of a fluorine laser device according to a first embodiment of the present invention.

FIG. 1 shows a configuration of a fluorine laser device 1 according to a first embodiment. In FIG. 1, the fluorine laser device 1 includes a laser chamber 2 containing laser gas being a laser medium. Laser gas includes, for example, helium (He), neon (Ne), mixed gas of He and Ne, and fluorine (F2).

High voltage is applied across discharge electrodes not illustrated which are placed inside the laser chamber 2 from a high-voltage power supply not illustrated, and discharge occurs across the discharge electrodes, thereby generating laser light 11. A front window 7 and a rear window 9 for transmitting the laser light 11 are fixed at both end portions of the laser chamber 2 to form a Brewster's angle relative to an optical axis of the laser light 11. A front slit 16 and a rear slit 17 having a front opening 33 and a rear opening 34 each having a predetermined width are respectively placed in front of (right side in FIG. 1) and behind the laser chamber 2.

In front of the front slit 16, placed is a front mirror 8 for partially transmitting the laser light 11 and emitting it. Behind the rear slit 17, disposed are two dispersion prisms 18 and 18, and behind the dispersion prisms 18 and 18, disposed is a rear mirror 6 for totally reflecting the laser light 11.

The laser light 11 oscillated inside the laser chamber 2 is transmitted through the rear window 9 and passes through the rear opening 34 and the two dispersion prisms 18 and 18. It is reflected at the rear mirror 6, passes through the dispersion prisms 18 and 18 and the rear opening 34 once again, and is transmitted through the rear window 9 to return to the laser chamber 2. Subsequently, the laser light 11 is transmitted through the front window 7 from the laser chamber 2 and emitted forward, then passes through the front opening 33 and is partially transmitted through the front mirror 8 to be emitted. It should be noted that in FIG. 1 the fluorine laser device 1 is seen from above, and in the explanation of the embodiment hereinafter, the direction vertical to the paper surface in FIG. 1 is a vertical direction.

In the laser light 11 oscillated inside the laser chamber 2, intense line light 11A and weak line light 11B coexist. Since the intense line light 11A and the weak line light 11B have different wavelengths, the refractive angles at which they enter and exit the dispersion prisms 18 and 18 differ. As a result, while the intense line light 11A and the weak line light 11B are passing and returning through the dispersion prisms 18 and 18, optical paths thereof are deviated from each other little by little.

In this situation, the intense line light 11A going and returning through the dispersion prisms 18 and 18 passes through the rear opening 34 and the front opening 33, and is emitted from the front mirror 8. On the other hand, while the weak line light 11B is going and returning through the two dispersion prisms 18 and 18, the optical path thereof is deviated, and the weak line light 11B is not oscillated by being blocked by either the front slit 16 or the rear slit 17. Thus, only the intense line light 11A is oscillated, and thereby the bandwidth of the wavelength of the laser light 11 is narrowed.

Figure 2:
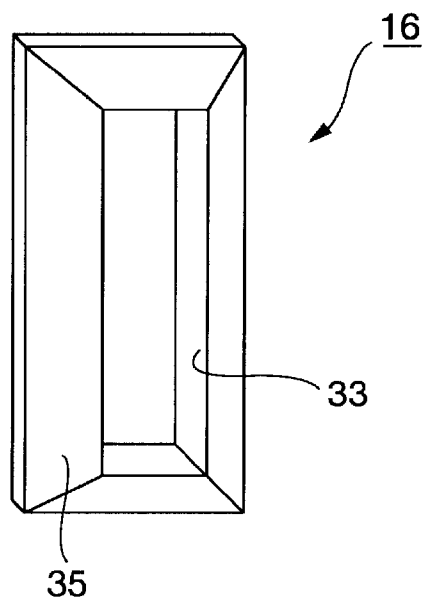
FIG. 2 is a perspective view showing a configuration of a slit according to the first embodiment.

An example of the front slit 16 according to the first embodiment is shown in FIG. 2. As shown in FIG. 2, a slit inclined plane 35 which is inclined is formed on one face of the front slit 16 so that the front opening 33 provided at approximately a center portion becomes convex relative to the outer perimeter. It should be noted that the rear slit 17 is in the same form.

As shown in FIG. 1, the front slit 16 and the rear slit 17 in the fluorine laser device 1 are disposed so that the slit inclined planes 35 face to the laser chamber 2. Since the amplified spontaneous emission 36 generated in the laser chamber 2 has a larger broadening angle than the laser light 11, it hits against the slit inclined plane 35 and is reflected to be away from the laser chamber 2. It should be noted that in the optical components such as the slits 16 and 17, mirrors 6 and 9, windows 7 and 9, and the like, the sides near the laser chamber 2 are called chamber sides, and the sides far from the laser chamber 2 are called opposite chamber sides hereinafter.

As explained above, according to the first embodiment, the slit inclined plane 35 is formed on one face of the opening of the slit so that the opening becomes convex relative to the outer perimeter, and the slit inclined plane 35 thus formed is disposed to face to the laser chamber 2. Thus, the amplified spontaneous emission 36 generated from the laser chamber 2 hits against the slit inclined plane 35 and is reflected in a direction away from the laser chamber 2, thereby lessening the amplified spontaneous emission 36 returning into the laser chamber 2. Accordingly, the amplified spontaneous emission 36 is not amplified once again in the laser chamber 2, and most of energy inputted for discharge contributes to the oscillation of the laser light 11, thus increasing the power of the laser light 11 to improve the energy efficiency of the laser device.

Figure 3:
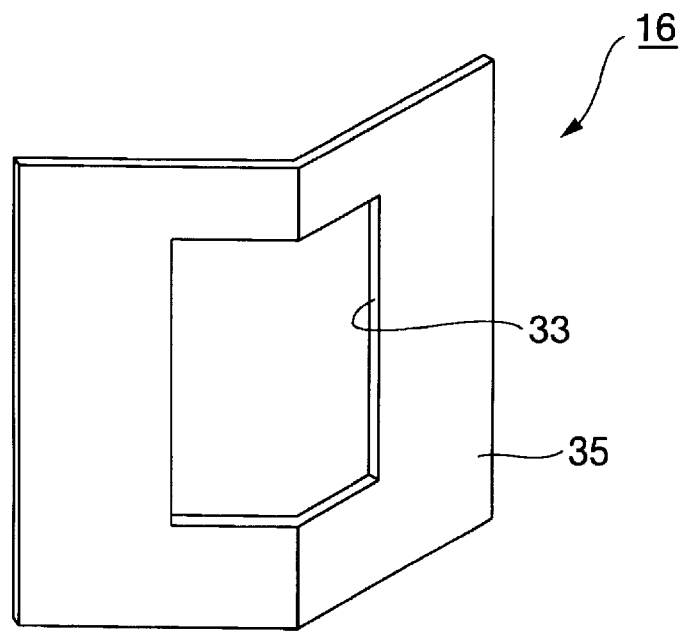
FIG. 3 is a perspective view showing another configuration example of the slit according to the first embodiment.
Figure 4:
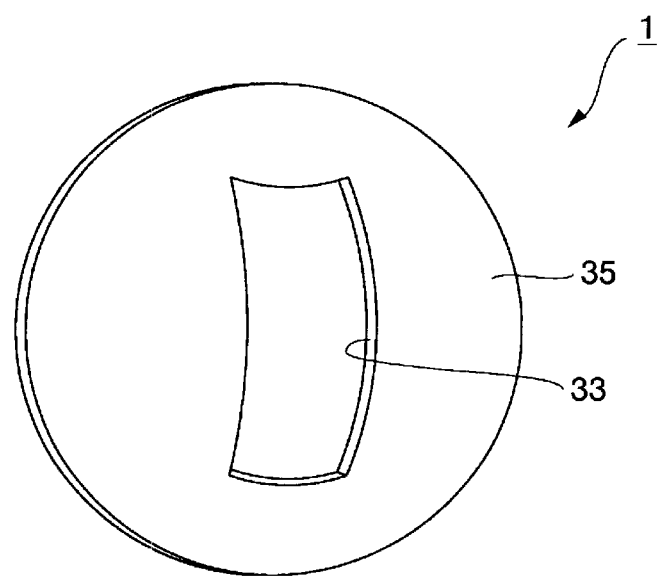
FIG. 4 is a perspective view showing still another configuration example of the slit according to the first embodiment.
Figure 5:
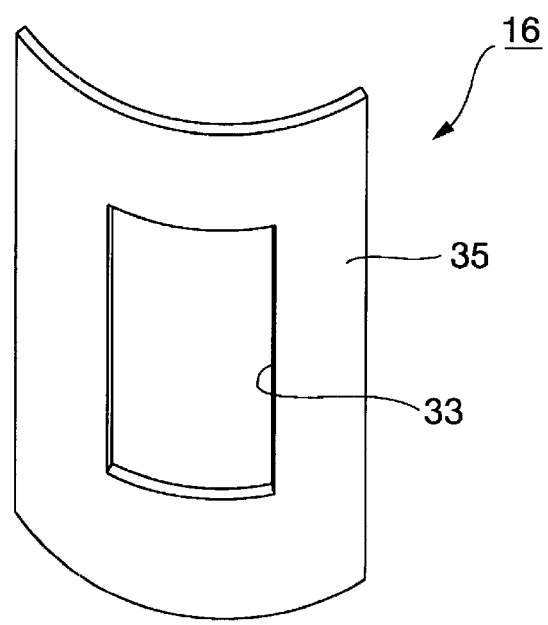
FIG. 5 is a perspective view showing another configuration example of the slit according to the fist embodiment.

The other configuration examples of the front slit 16 according to the first embodiment will be shown in FIG. 3 to FIG. 5. It should be noted that the same examples are applied to the rear slit 17.

As shown in FIG. 3, in the front slit 16, the slit inclined plane 35 may be formed so that the front opening 33 is in a convex form relative to one direction. Further, as shown in FIG. 4, the front slit 16 may have the form in which the opening 33 is provided in a spherical surface, and as shown in FIG. 5, it may have the form in which the opening 33 is provided in a curved surface being convex only in one direction, which is a cut-out portion of a hollow cylinder. In any case, the amplified spontaneous emission 36 emitted from the laser chamber 2 is reflected at the slit inclined plane 35 to be away from the laser chamber 2. Accordingly, it seldom happens that the amplified spontaneous emission 36 reenters the laser chamber 2, and the same effects can be obtained.

Next, a second embodiment will be explained.

Figure 6:
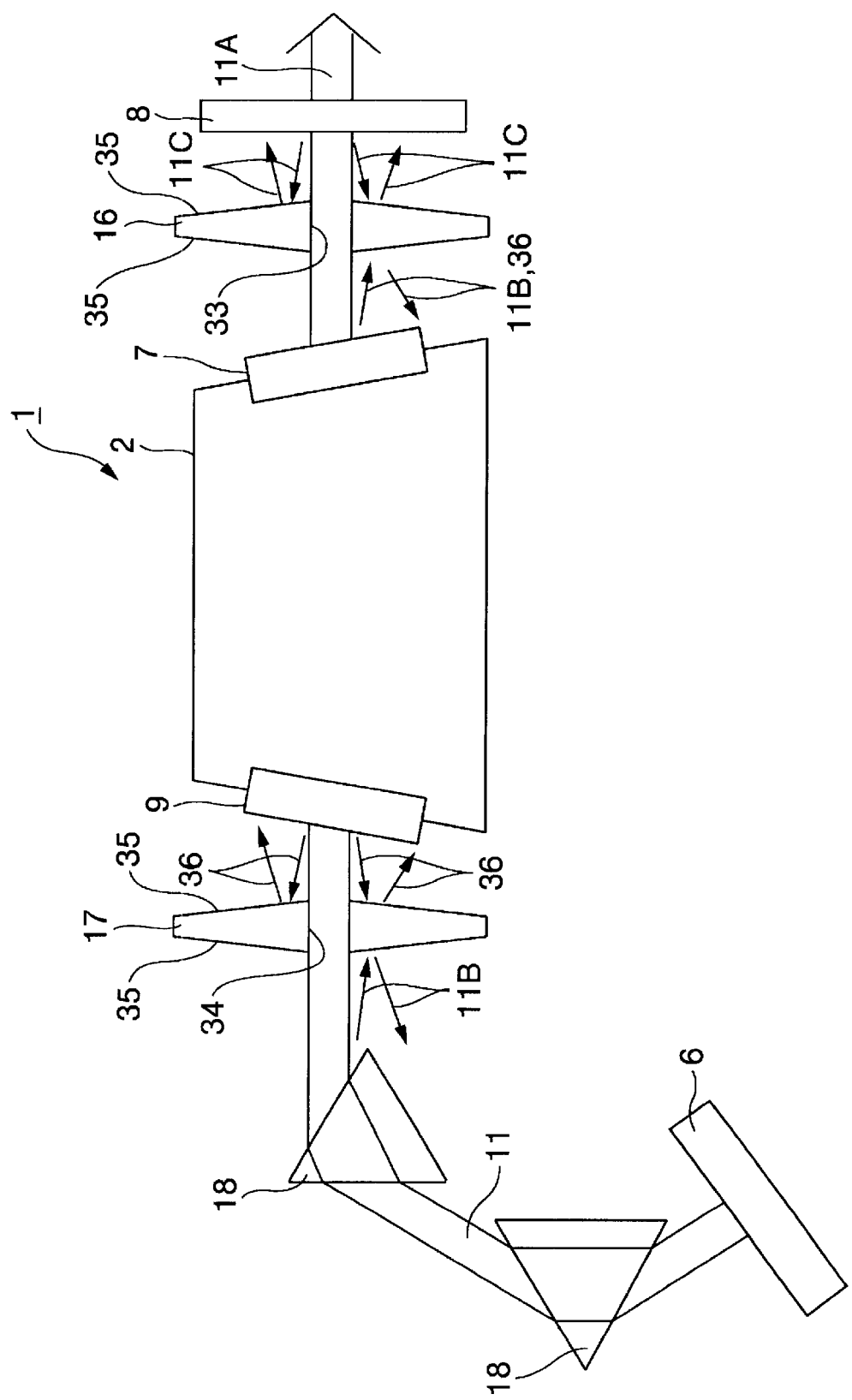
FIG. 6 is an explanatory view showing a configuration of a fluorine laser device according to a second embodiment of the present invention.
Figure 7:
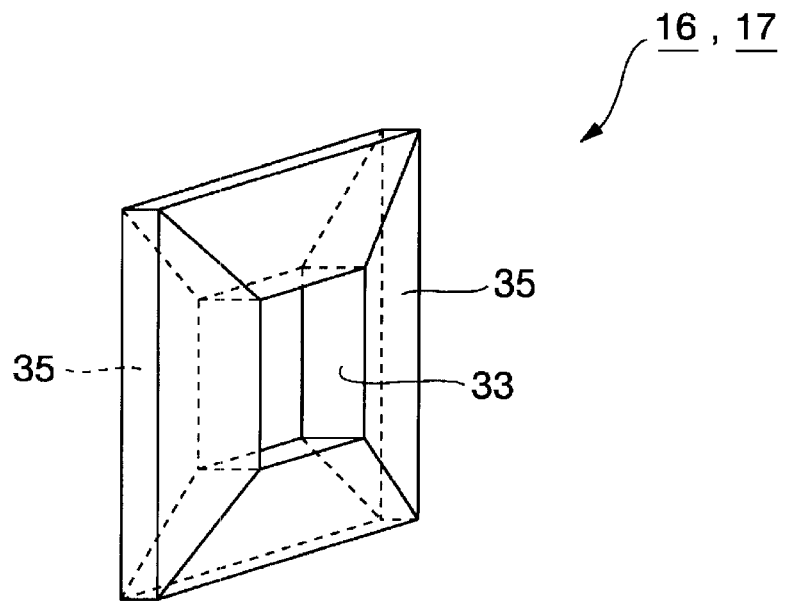
FIG. 7 is a perspective view showing a configuration of a slit according to the second embodiment.

A configuration of a fluorine laser device according to a second embodiment is shown in FIG. 6. A front slit 16 according to the second embodiment is shown in FIG. 7. A rear slit 17 is the same as the front slit 16. As shown in FIG. 6 and FIG. 7, slit inclined planes 35 and 35 are respectively formed on both side surfaces at the chamber sides and the opposite chamber sides of the slits 16 and 17 so that the openings 33 and 34 become convex relative to the outer perimeters of the slits 16 and 17.

As shown in FIG. 6, amplified spontaneous emission 36 generated from a laser chamber 2 hits against the slit inclined planes 35 formed on the chamber sides of the front and rear slits 16 and 17, and is reflected in a direction away from the laser chamber 2 as in the first embodiment. Weak line light 11B separated from intense line light A at dispersion prisms 18 and 18 also hits against the slit inclined plane 35 formed on the opposite chamber side of the rear slit 17 and the slit inclined plane 35 formed on the opposite chamber side of the front slit 16. The weak line light 11B is then reflected in a direction away from the laser chamber 2.

As explained above, according to the second embodiment, in addition to the effect of the first embodiment which prevents the amplified spontaneous emission 36 from entering the laser chamber 2 once again, the weak line light 11B can be also prevented from entering the laser chamber 2 once again. Accordingly, less of the weak line light 11B is amplified again inside the laser chamber 2, thus increasing the ratio of the energy inputted by means of discharge which contributes to the oscillation of the desired intense line light 11A. Thereby less weak line light 11B is mixed into the emitted laser light 11, and monochromatic property of the laser light 11 is improved to thereby increase the machining accuracy.

Figure 8:
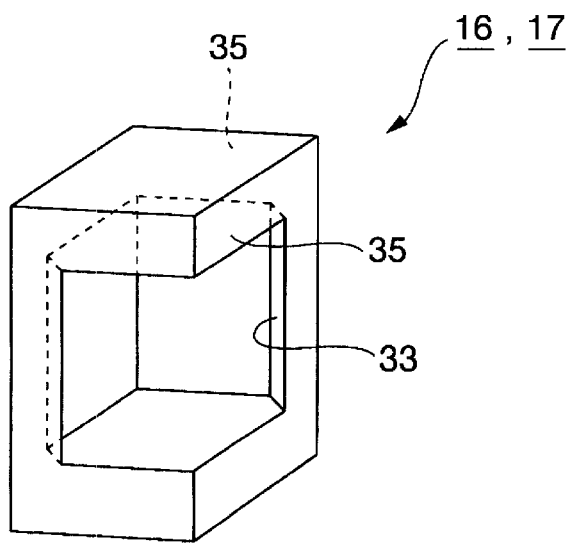
FIG. 8 is a perspective view showing another configuration example of the slit according to the second embodiment.
Figure 9:
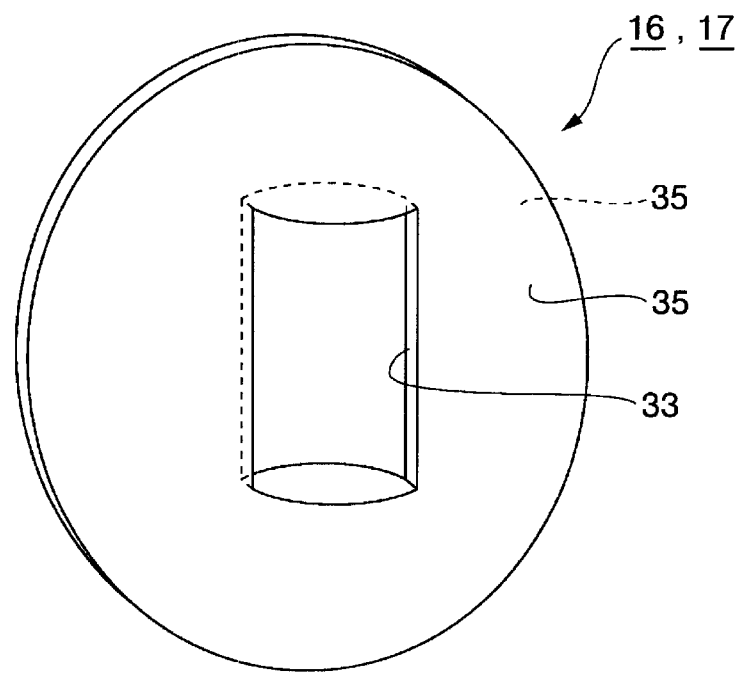
FIG. 9 is a perspective view showing still another configuration example of the slit according to the second embodiment.
Figure 10:
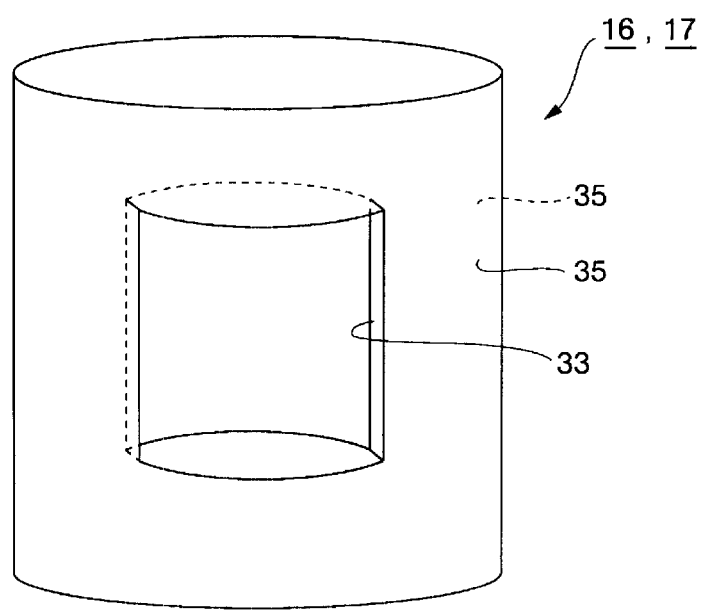
FIG. 10 is a perspective view showing another configuration example of the slit according to the second embodiment.

The other configuration examples of the front slit 16 according to the second embodiment are shown in FIG. 8 to FIG. 10. It should be noted that the rear slit 17 has the same form. As shown in FIG. 8, the slits 16 and 17 may have the slit inclined plane 35 formed to be in a convex form only in one direction. As shown in FIG. 9, they may be in the form in which the opening 33 is provided in a curved surface in a convex lens form with both sides being convex. As shown in FIG. 10, they may be in the form in which the opening 33 is provided in a pillar-shaped curved surface with an oval or circular bottom surface.

Next, a third embodiment will be explained.

Figure 11:
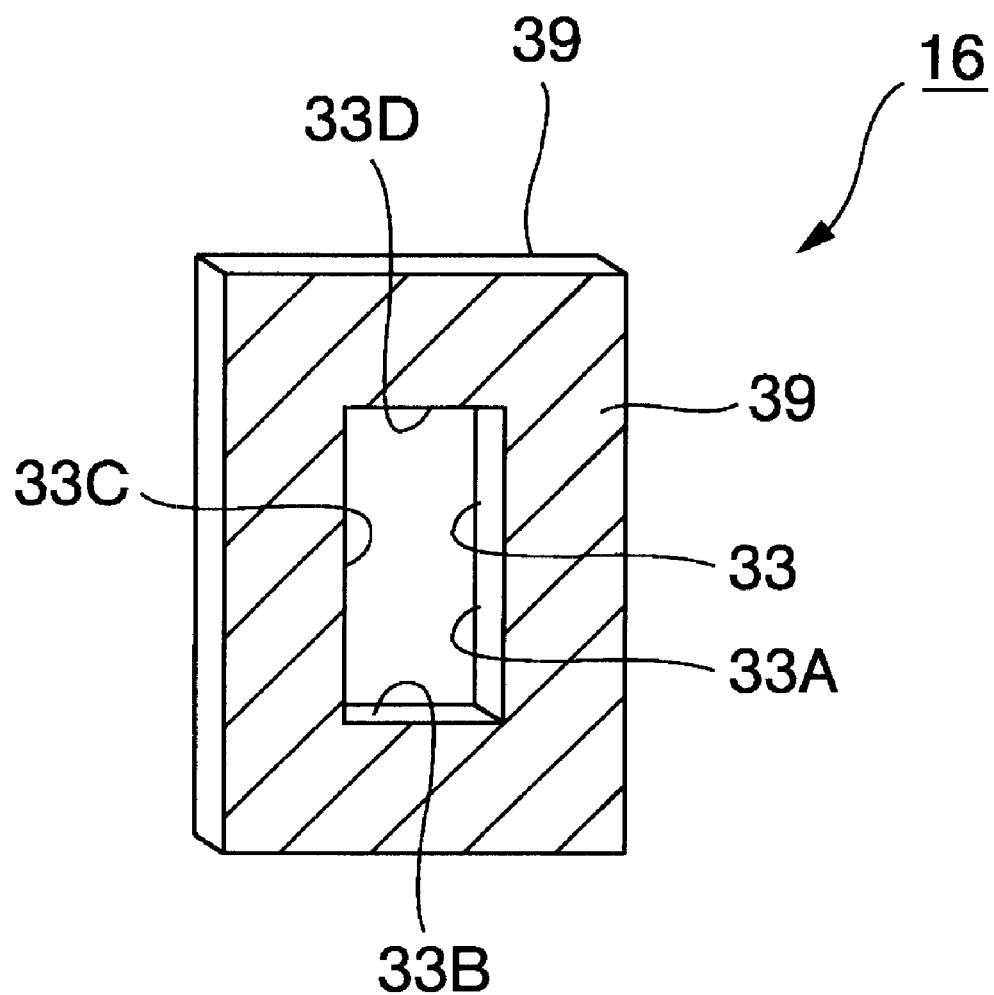
FIG. 11 is a perspective view showing a configuration of a slit according to a third embodiment of the present invention.
Figure 12:
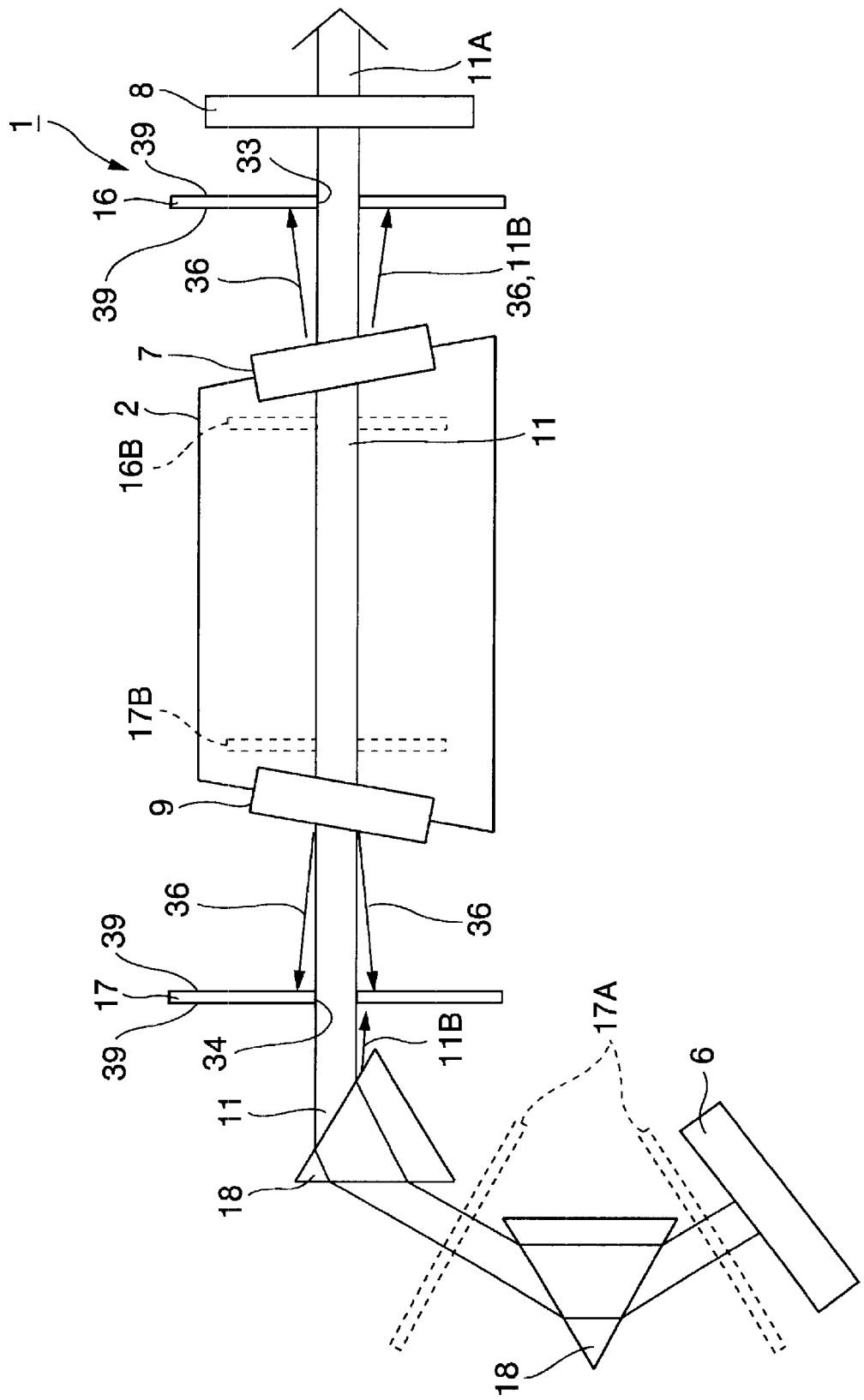
FIG. 12 is an explanatory view showing a configuration of a fluorine laser device according to the third embodiment.

A front slit 16 according to the third embodiment is shown in FIG. 11. A fluorine laser device 1 according to the third embodiment is shown in FIG. 12. As shown in FIG. 11, the front slit 16 is formed by providing an opening 33 in a flat plate. Matte black nickel plating 39 is applied onto a chamber side surface of the front slit 16. A rear slit 17 is the same as the front slit 16.

The slits on which the matte black nickel plating 39 is thus applied are disposed in front of and behind the laser chamber 2 as shown in FIG. 12. As a result of applying the black nickel plating 39 on the surfaces of the slits 16 and 17, the reflection of amplified spontaneous emission 36 on the surfaces of the slits 16 and 17 decreases. Thereby, the amplified spontaneous emission 36 is prevented from returning into the laser chamber 2, and most of the discharge energy is spent to oscillate the laser light 11, thus increasing the output of the laser light 11.

It is more preferable to apply the black nickel plating 39 onto both of the chamber sides and the opposite chamber sides of the slits 16 and 17. Thereby, reflections of weak line light 11B and the amplified spontaneous emission 36 (hereinafter both of them are called unwanted lights 11B and 36 together) on the surfaces of the slits 16 and 17 are decreased. Consequently, the unwanted lights 11B and 36 are prevented from returning into the laser chamber 2, and discharge energy is used only for the oscillation of the intense line light 11A, thus increasing the output of the intense line light 11A and improving monochromatic property of the laser light 11.

As shown by the broken line in FIG. 12, instead of the rear slit 17, a rear slit 17A may be placed between the dispersion prisms 18 and 18, or between the dispersion prism 18 and a rear mirror 6. Thereby, as in the case in which the rear slit 17 is disposed between the dispersion prism 18 and the laser chamber 2, the unwanted lights 11B and 36 can be prevented from returning into the laser chamber 2.

Further, as shown by the broken line in FIG. 12, instead of the slits 16 and 17, a front slit 16B and a rear slit 17B may be provided inside the laser chamber 2. Thereby, the space in which the slits 16 and 17 are placed outside the laser chamber 2 is not needed, thus reducing the fluorine laser device 1 in size. Further, a resonator length being the distance between the front mirror 8 and the rear mirror 6 is shortened, and thus the power of the laser light 11 is increased.

When the third embodiment is configured in combination with the first or the second embodiment, the effect is further enhanced. Specifically, in the first and the second embodiment, by providing the slit inclined planes 35 at the slits 16 and 17, the unwanted lights 11B and 36 are designed to be reflected in the direction away from the laser chamber 2. In addition, if the black nickel plating 39 is applied onto the surfaces of the slits 16 and 17 as explained in the third embodiment, the reflectivity on the surfaces of the slits 16 and 17 are reduced. Accordingly, the unwanted lights 11B and 36 returning into the laser chamber 2 can be reduced more reliably. Thus, the fluorine laser device 1 with favorable monochromatic property of the laser light 11 and with excellent energy efficiency can be obtained.

It is preferable to apply the black nickel plating 39 onto end portions 33A to 33D of the opening 33 as shown in FIG. 11 as well as on the both side surfaces of the chamber sides and the opposite chamber sides of the slits 16 and 17. Thereby, the laser light 11 and the amplified spontaneous emission 36 being irregularly reflected at the end portions 33A to 33D are lessened, and the unwanted lights 11B and 36 returning into the laser chamber 2 are further reduced.

Next, a fourth embodiment will be explained.

Figure 13:
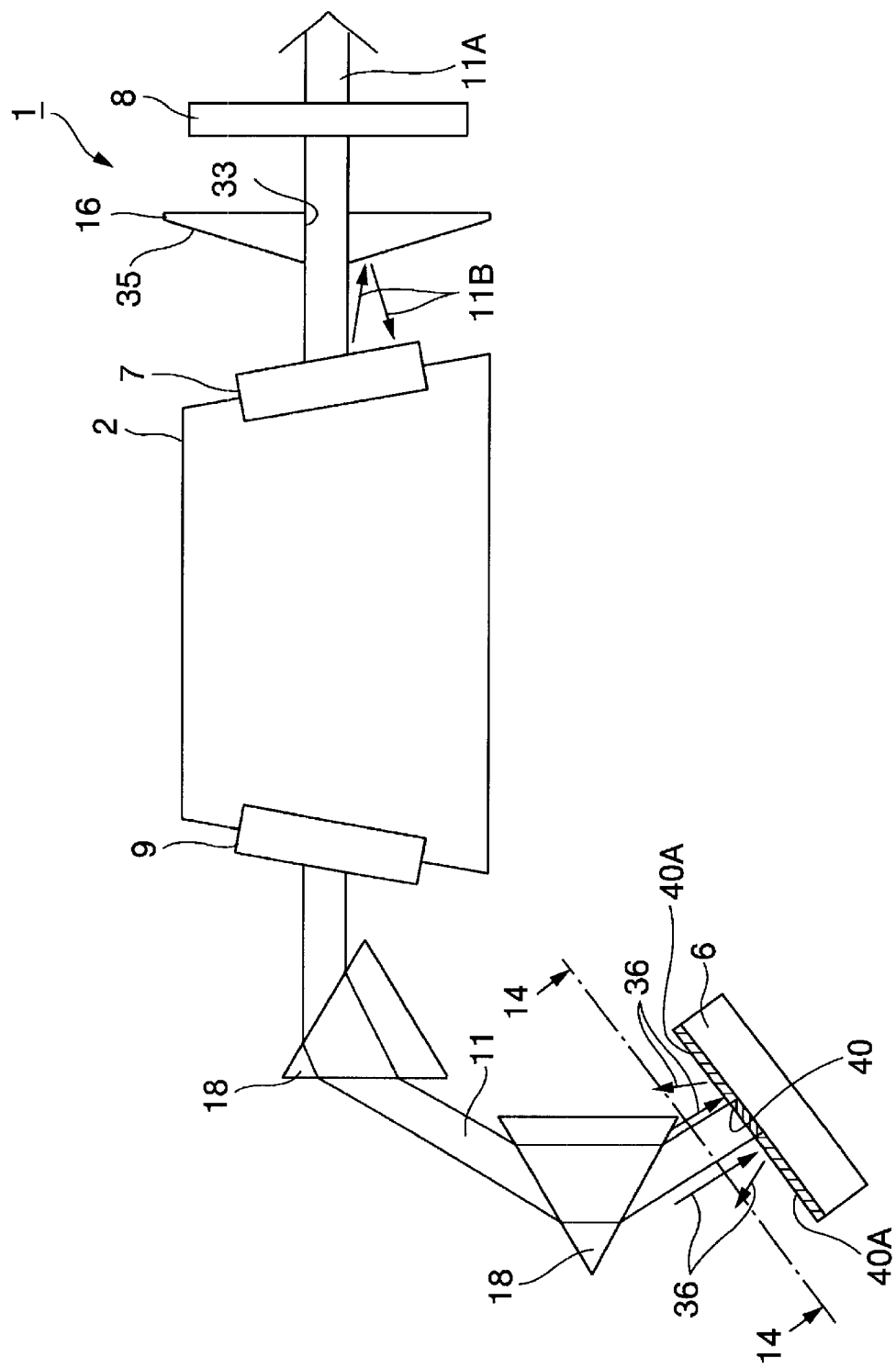
FIG. 13 is an explanatory view showing a configuration of a fluorine laser device according to a fourth embodiment of the present invention.
Figure 14:
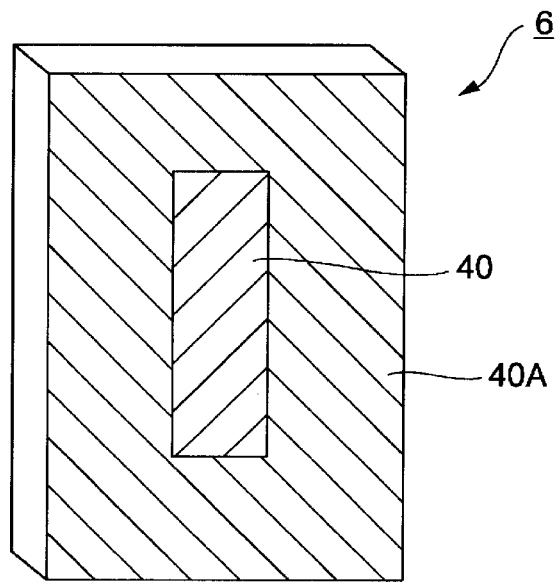
FIG. 14 is a view taken along the line 14—14 in FIG. 13, and is a perspective view showing an incidence plane for laser light of a rear mirror.

A configuration of a fluorine laser device 1 according to the fourth embodiment is shown in FIG. 13. Further, FIG. 14 is a view taken along the line 14—14 in FIG. 13, and shows the incidence surface for laser light 11 of a rear mirror 6. As shown in FIG. 14, at approximately the center portion of the rear mirror 6, total reflection coating for totally reflecting the laser light 11 at high reflectivity and at low absorptivity is applied to the area to which the laser light 11 is emitted to thereby define a rear mirror total reflection portion 40. The form of the rear mirror total reflection portion 40 is approximately the same as the form of the intense line light 11A of the laser light 11. It is preferable that the reflectivity of the rear mirror total reflection portion 40 is not less than 90%, and the higher the reflectivity is, the more preferable it is (for example, the closer to 100%). Further, it is preferable that coating for irregularly reflecting or absorbing, for example, the amplified spontaneous emission 36 is applied onto an outer periphery portion 40A being the periphery outside the total reflection portion 40.

As shown in FIG. 13, the laser light 11 emitted to the rear of the laser chamber 2 passes through the dispersion prisms 18 and 18, hits against the rear mirror total reflection portion 40 and is reflected, and then passes through the laser chamber 2 to be emitted from the front mirror 8. On the other hand, since the amplified spontaneous emission 36 emitted rearward from the laser chamber 2 has a larger broadening angle than the laser light 11, it is widened while it is traveling up to the rear mirror 6, and most of it hits against the outer periphery portion 40A outside the rear mirror total reflection portion 40. As a result, most of the amplified spontaneous emission 36 is scattered or absorbed at the outer periphery portion 40A, and therefore less of the spontaneous emission 36 returns to the laser chamber 2. Accordingly, most of the energy of discharge occurring in the laser chamber 2 is spent for the oscillation of the intense line light 11A, and the output of the intense line light 11A is increased.

Figure 15:
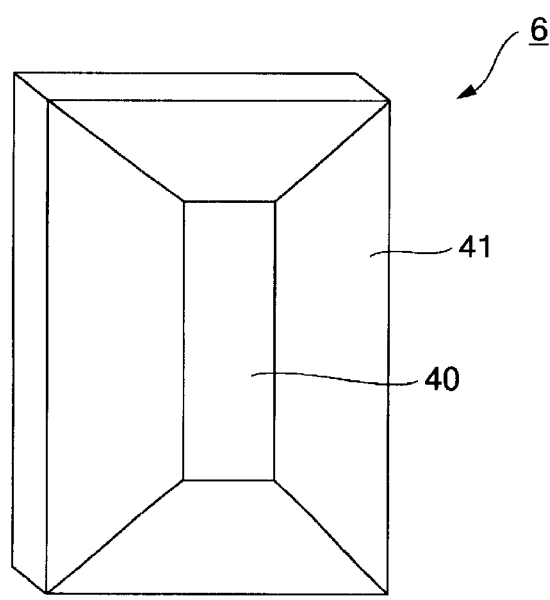
FIG. 15 is a perspective view showing another example of the incidence plane for the laser light, of a rear mirror according to the fourth embodiment.

Another configuration example of the rear mirror 6 according to the fourth embodiment is shown in FIG. 15. As shown in FIG. 15, the rear mirror total reflection portion 40 is formed in approximately the center of the incidence surface of the rear mirror 6. A rear mirror inclined plane 41 is formed at the outer perimeter portion of the rear mirror total reflection portion 40 so that the rear mirror total reflection portion 40 is convex relative to the outer edge of the rear mirror 6. Total reflection coating for reflecting the amplified spontaneous emission 36 at high reflectivity is applied on the rear mirror inclined plane 41.

Figure 16:
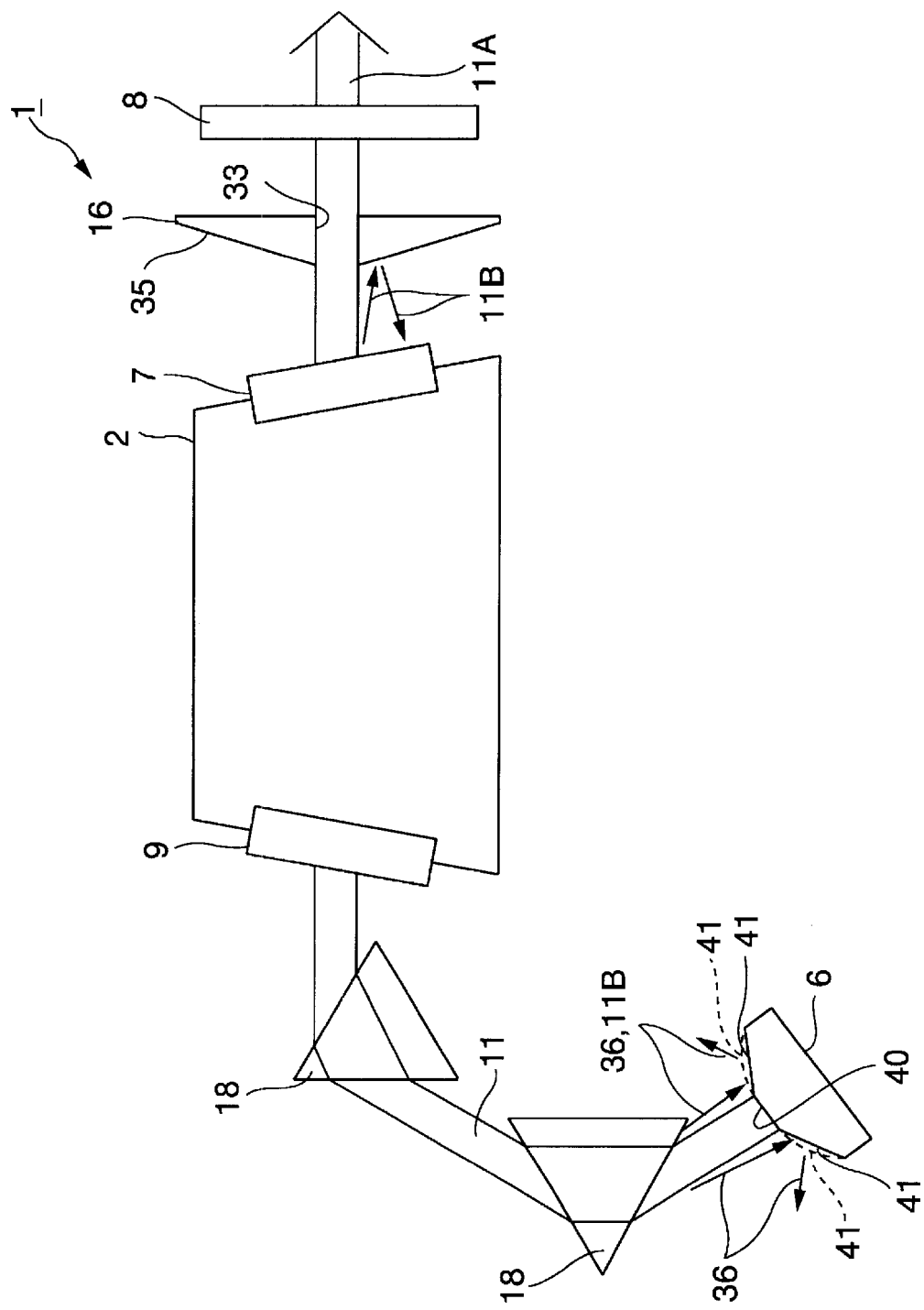
FIG. 16 is an explanatory view showing a configuration of a fluorine laser device using the rear mirror shown in FIG. 15.

FIG. 16 shows the configuration of the fluorine laser device 1 using the rear mirror 6 shown in FIG. 15. As shown in FIG. 16, since the amplified spontaneous emission 36 has a larger broadening angle than the laser light 11, it is widened while it is traveling from the laser chamber 2 up to the rear mirror 6, and most of it hits against the rear mirror inclined plane 41 provided at the outer perimeter portion of the rear mirror total reflection portion 40. The amplified spontaneous emission 36 hitting against the rear mirror inclined plane 41 is reflected in a direction away from the laser chamber 2, and less of it returns to the laser chamber 2.

Further, the weak line 11B is also separated from the intense line light 11A by the dispersion prisms 18 and 18, and is off the rear mirror total reflection portion 40 to hit against the rear mirror inclined plane 41, and is reflected in the direction away from the laser chamber 2. In FIG. 15, the rear mirror inclined plane 41 is a plane, but it may be a curved surface as shown by the broken line 41 in FIG. 16.

As explained above, according to the fourth embodiment, the total reflection coating is applied onto only the portion reflecting the laser light 11 on the rear mirror 6, thereby defining the rear mirror total reflection portion 40. As a result, while only the laser light 11 is reflected at the rear mirror total reflection portion 40 and returns inside the laser chamber 2, the amplified spontaneous emission 36 does not hit against the rear mirror total reflection portion 40, and does not return into the laser chamber 2. Accordingly, most of the discharge energy inputted into the laser chamber 2 is spent for oscillation of the laser light 11, thus increasing the output of the laser light 11.

Further, since the coating for absorbing or irregularly reflecting the amplified spontaneous emission 36 is applied onto the surface other than the rear mirror total reflection portion 40, the amplified spontaneous emission 36 can be more reliably prevented from returning to the laser chamber 2.

Further, the rear mirror inclined plane 41 is formed on the incidence surface for the laser light 11 so that the rear mirror total reflection portion 40 becomes convex. As a result, the amplified spontaneous emission 36 and the weak line light 11B, which are off the rear mirror total reflection portion 40, hit against the rear mirror inclined plane 41 and are reflected in the direction away from the laser chamber 2, and less of them returns to the laser chamber 2.

Further, since the rear mirror 6 plays the role of the rear slit 17 (See FIG. 1), the rear slit 17 is not required. Accordingly, the fluorine laser device 1 is reduced in size, and the aforementioned resonator length is shortened, thus increasing the power of the laser light 11.

Next, a fifth embodiment will be explained.

Figure 17:
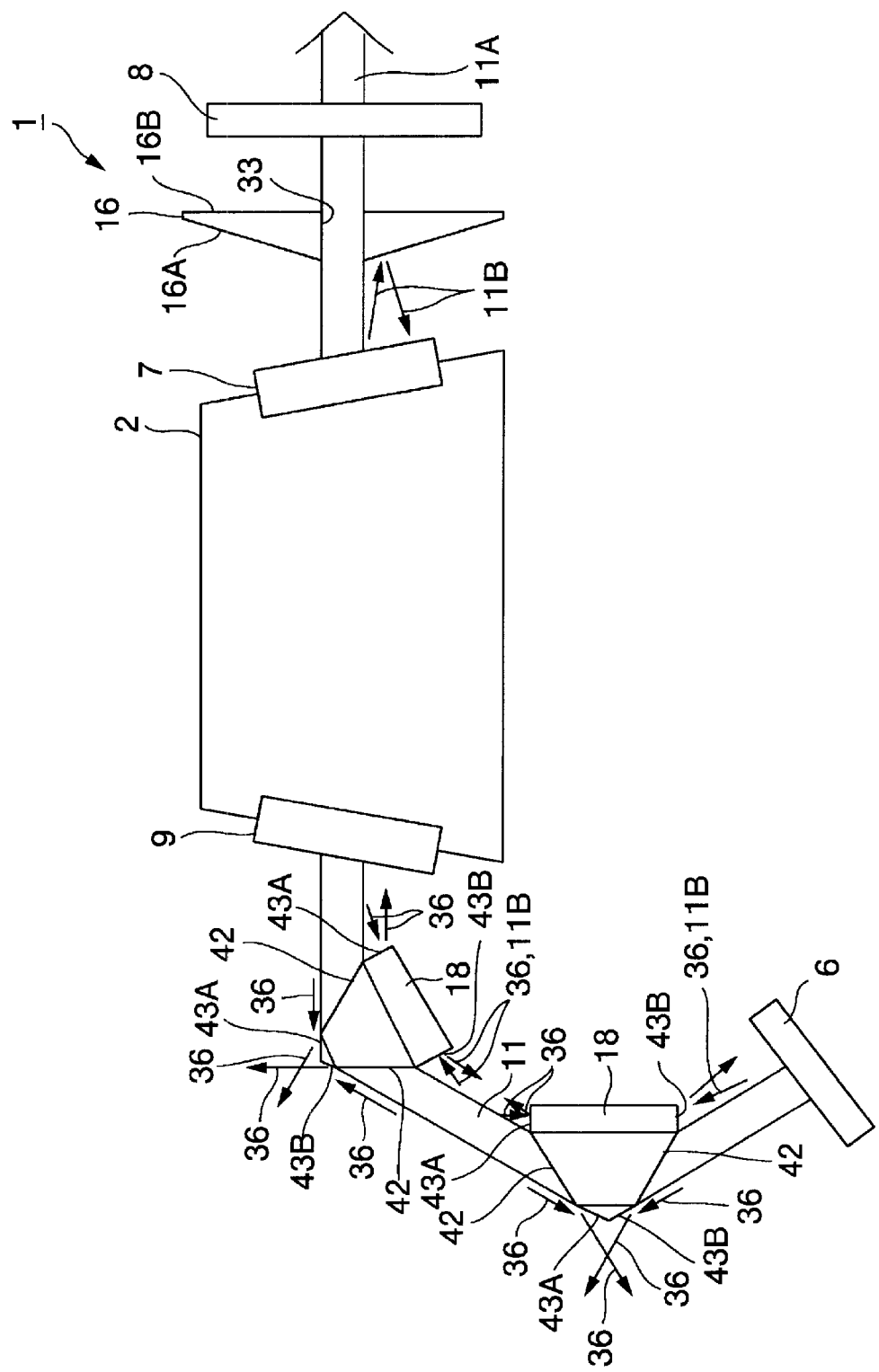
FIG. 17 is an explanatory view showing a configuration of a fluorine laser device according to a fifth embodiment of the present invention.

A configuration of a fluorine laser device 1 according to the fifth embodiment is shown in FIG. 17. As shown in FIG. 17, dispersion prisms 18 and 18 disposed behind a laser chamber 2 respectively include prism transmission portions 42 for transmitting the laser light 11 in correspondence with the beam width of the laser light 11. In this situation, the width of the incidence surface for the laser light 11 of the prism transmission portion 42 seen from above is approximately the same as the width of the intense line light 11A of the laser light 11.

At both side portions of the prism transmission portion 42 seen from above, prism inclined planes 43A and 43B are formed from the prism transmission portion 42 toward both end portions of the dispersion prisms 18 and 18 so that the prism transmission portion 42 becomes convex. The prism inclined planes 43A and 43B may be formed by curved surfaces other than the flat planes as shown in FIG. 17.

As shown in FIG. 17, since the amplified spontaneous emission 36 has a larger broadening angle than the laser light 11, it is widened while it is traveling from the laser chamber 2 to the dispersion prisms 18 and 18, and most of it hits against the prism inclined planes 43A and 43A on the chamber side of the dispersion prisms 18 and 18. The amplified spontaneous emission 36 hitting against the prism inclined plane 43A is reflected in the direction away from the laser chamber 2, and less of it returns to the laser chamber 2. The amplified spontaneous emission 36 reflected at the rear mirror 6 also hits against the prism inclined planes 43B and 43B on the opposite chamber side of the dispersion prisms 18 and 18, and is reflected in the direction away from the laser chamber 2.

As shown in FIG. 17, the weak line light 11B, which is separated at the dispersion prisms 18 and 18 and reflected at the rear mirror 6, also hits against the prism inclined planes 43B and 43B on the opposite chamber side of the dispersion prisms 18 and 18. It is then reflected in the direction away from the laser chamber 2, and less of it returns to the laser chamber 2. As a result, the rear slit 17 is not needed.

As described above as a result that the prism transmission portions 42 of the dispersion prisms 18 and 18 are made to have almost the same width as the intense line light 11A of the laser light 11 and the prism inclined planes 43 are provided at both sides thereof, the unwanted light 11B and 36 returning into the laser chamber 2 can be decreased. Accordingly, the fluorine laser device 1 with excellent monochromatic property of the laser light 11 and favorable energy efficiency can be obtained.

Figure 18:
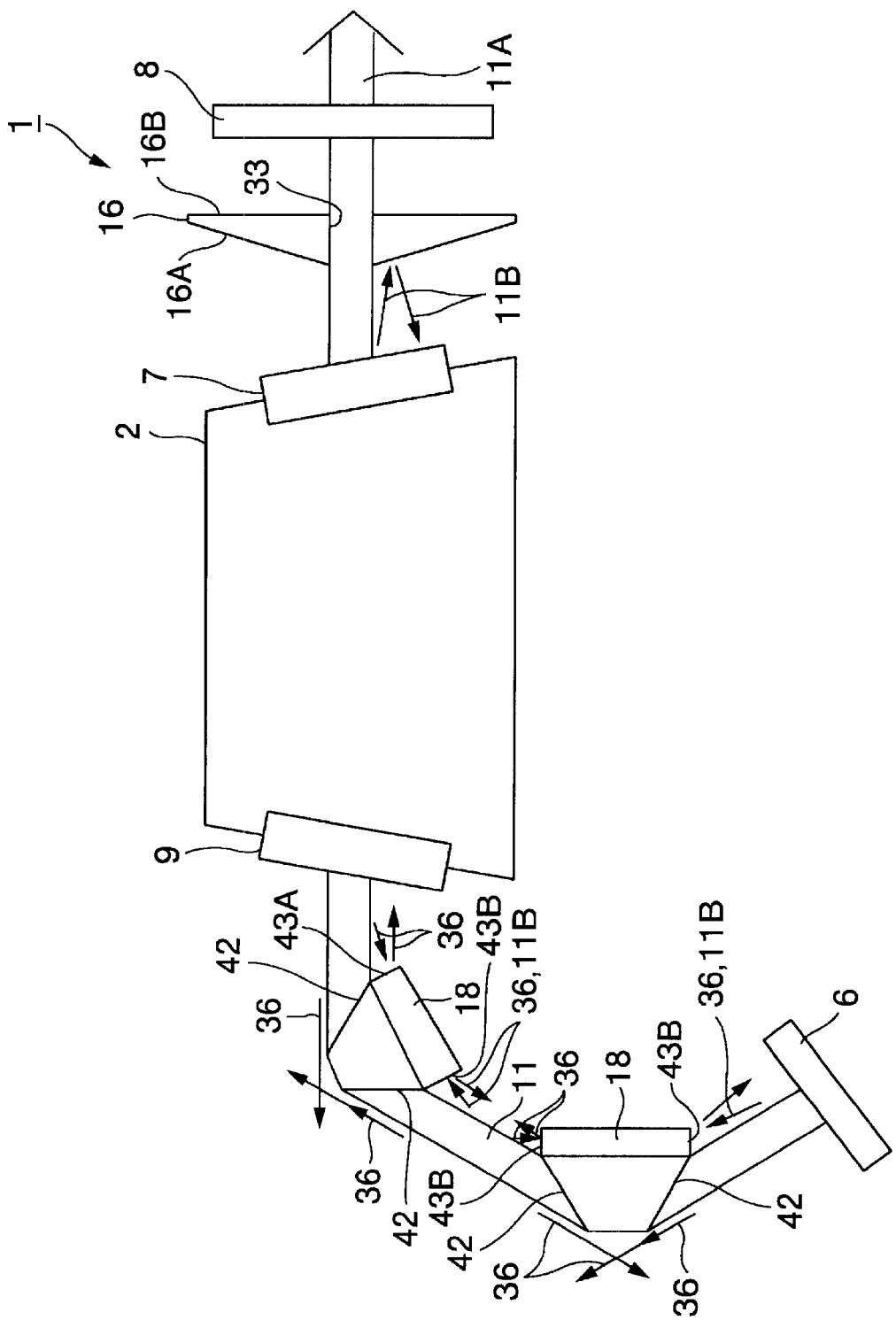
FIG. 18 is an explanatory view showing another configuration example of the fluorine laser device according to the fifth embodiment.

Another configuration example of the fluorine laser device 1 according to the fifth embodiment is shown in FIG. 18. As shown in FIG. 18, the dispersion prisms 18 and 18 have one side portions of the prism transmission portions 42 cut out and are in a trapezoidal form. Even if the one side portions are cut out like this, the unwanted light 11B and 36 are reflected to be away from the laser chamber 2, thus providing the same effect.

Next, a sixth embodiment will be explained.

Figure 19:
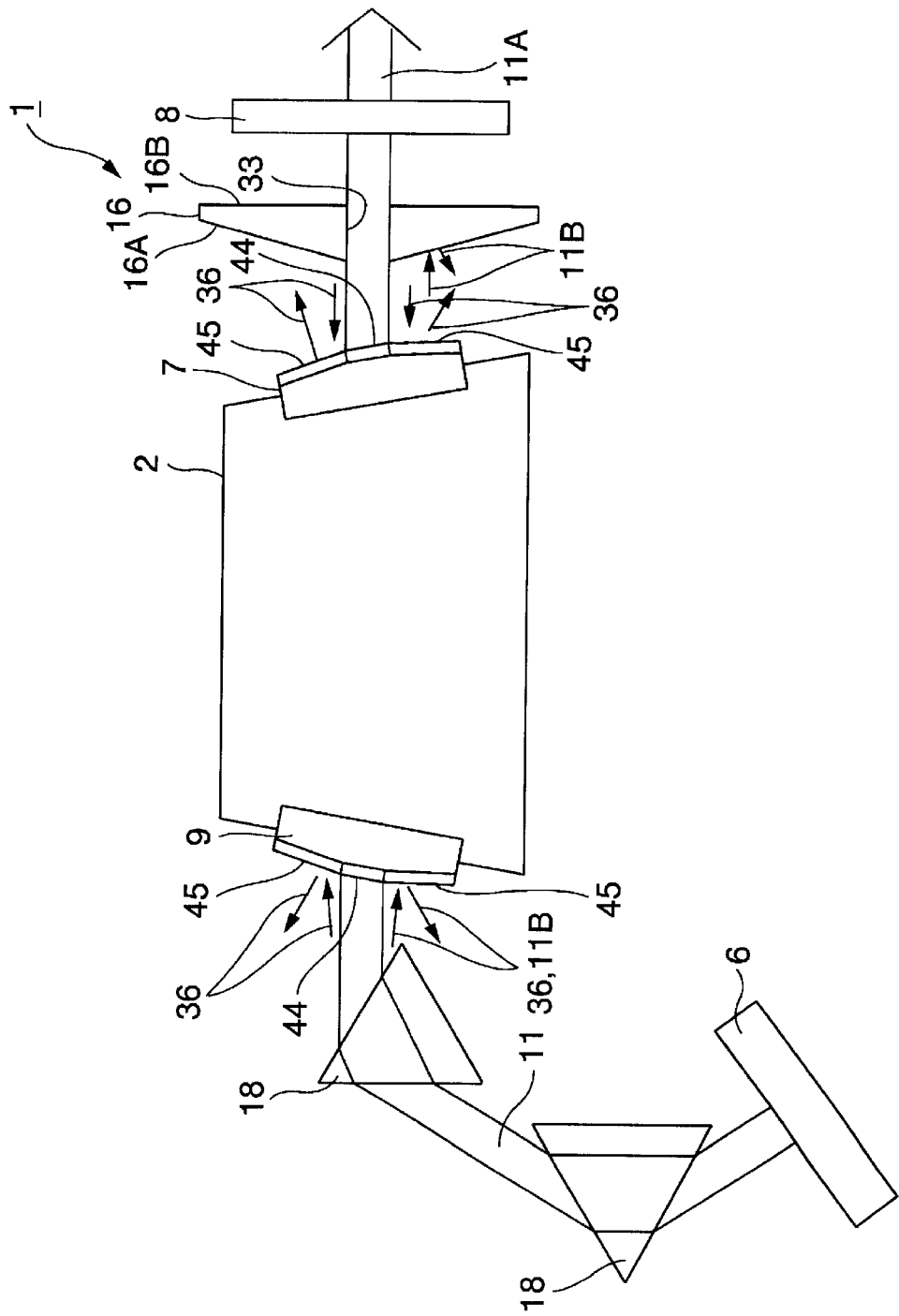
FIG. 19 is an explanatory view showing a configuration of a fluorine laser device according to a sixth embodiment of the present invention.

A configuration of a fluorine laser device 1 according to a sixth embodiment is shown in FIG. 19. In FIG. 19, the fluorine laser device 1 includes a front window 7 and a rear window 9 for transmitting laser light 11 at the front and rear portion of a laser chamber 2. Windows 7 and 9 are attached so as to form a Brewster's angle relative to the optical axis of the laser light 11.

Figure 20:
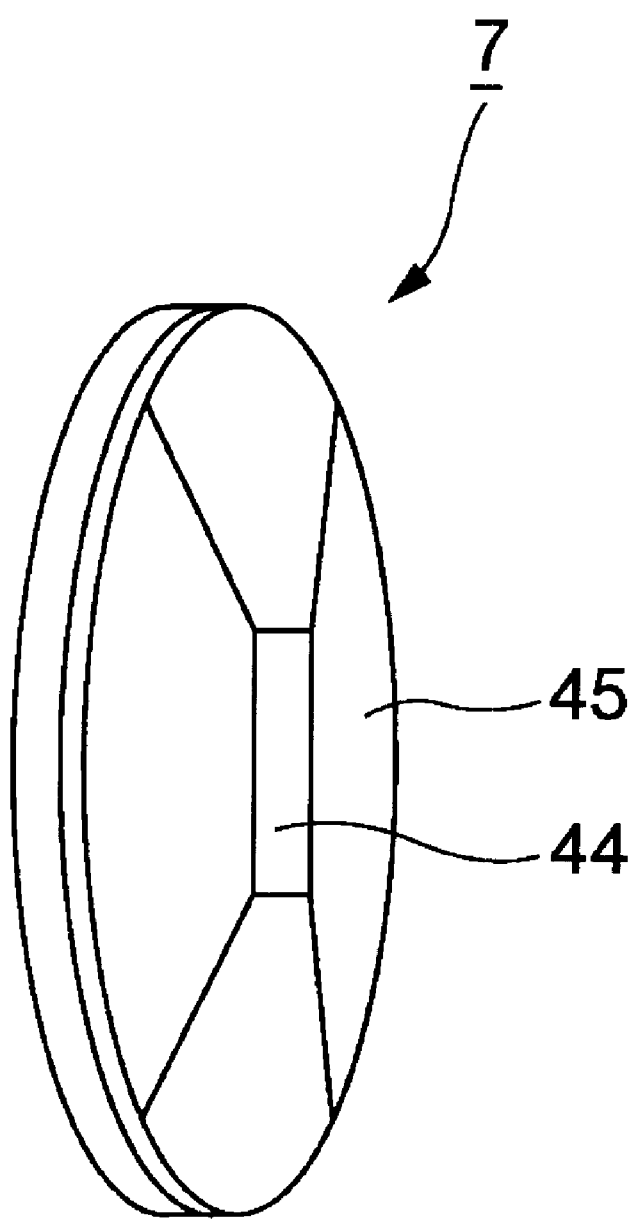
FIG. 20 is a perspective view showing a configuration of a front window according to the sixth embodiment.
Figure 21:
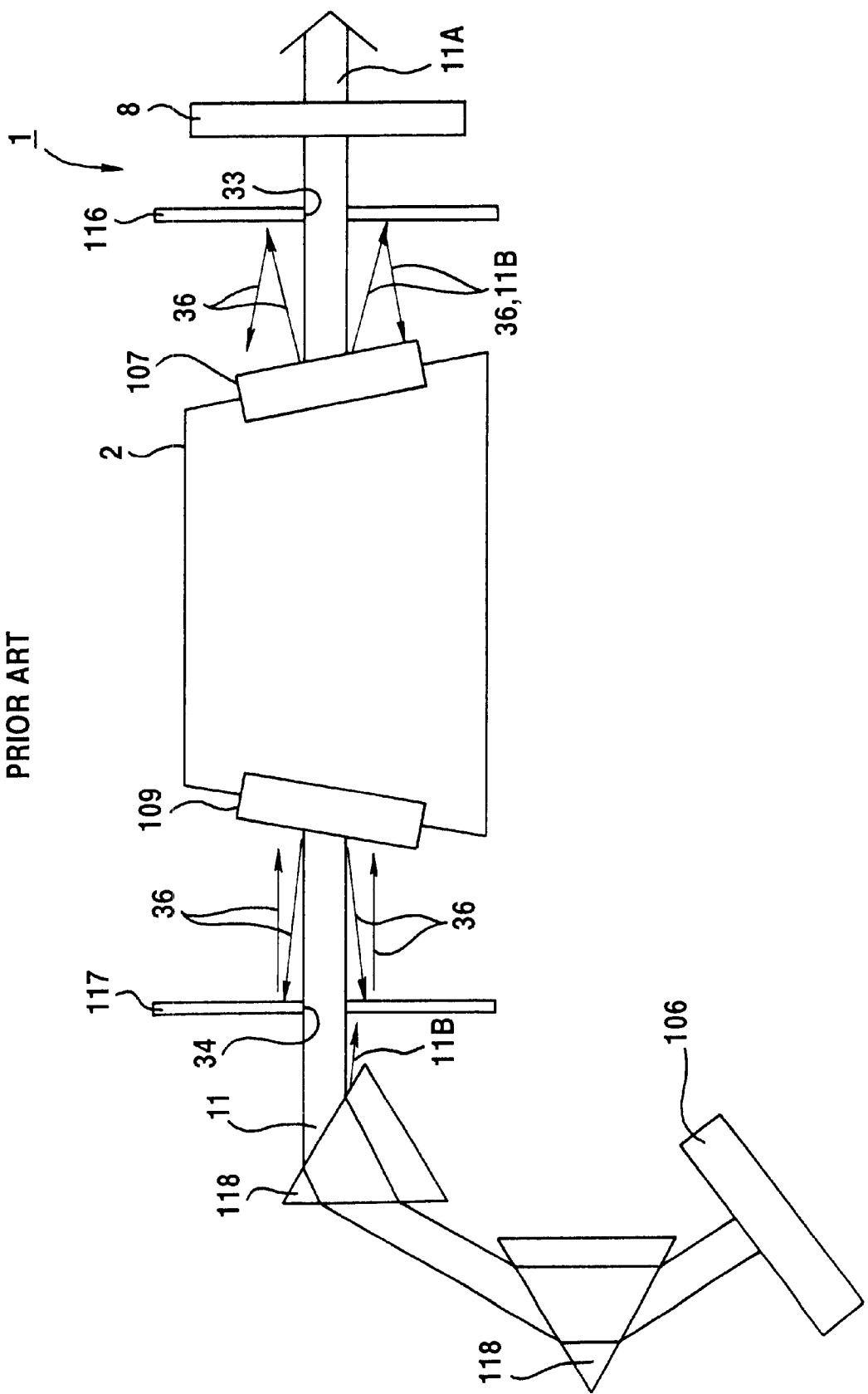
FIG. 21 is an explanatory view showing a configuration of a fluorine laser device according to a prior art.

A configuration of a front window 7 according to the sixth embodiment is shown in FIG. 20. The rear window 9 has the same configuration. At approximately a center portion of the front window 7, included is a window transmission portion 44 having almost the same form as a sectional form of the laser light 11 and transmitting the laser light 11, for example, at high transmissivity of not less than 90%. The window transmission portion 44 may be formed with nonreflective coating being applied thereon as shown in FIG. 19, or it may formed without such coating being applied thereon. Applying coating provides the advantage of improving the transmissivity, and forming the window transmission portion 44 without applying the coating provides the advantage of increasing the durability against the laser light 11 to increase the life span of the windows 7 and 9.

Window inclined planes 45 are formed on an opposite chamber side of the front window 7 so that the window transmission portion 44 becomes convex relative to the outer perimeter of the front window 7. Total reflection coating for reflecting the laser light 11 and the amplified spontaneous emission 36 at high reflectivity is applied onto the window inclined planes 45. The window inclined plane 45 may be formed by a curved surface other than the flat plane as shown in FIG. 17. The higher the reflectivity of the total reflection coating, the better, and the reflectivity of not less than 90%, is preferable.

As shown in FIG. 19, since the amplified spontaneous emission 36 emitted rearward from the laser chamber 2 has a larger broadening angle than the laser light 11, it expands more outwardly than the laser light 11 while it is passing through the dispersion prisms 18 and 18 and is reflected at the rear mirror 6. It then hits against the window inclines planes 45 of the rear window 9 and is reflected to be away from the laser chamber 2. Thus, less of the amplified spontaneous emission 36 returns to the laser chamber 2.

As shown in FIG. 19, as for the amplified spontaneous emission 36 emitted forward from the laser chamber 2, part of it is reflected at the front mirror 8 and returns toward the laser chamber 2. The reflected amplified spontaneous emission 36 hits against the window inclined planes 45 of the front window 7 and is reflected to be away from the laser chamber 2. Thus, less of the amplified spontaneous emission 36 returns to the laser chamber 2.

As shown in FIG. 19, the weak line light 11B is separated from the dispersion prisms 18 and 18, and hits against the window inclined planes 45 of the rear window 9 and is reflected to be away from the laser chamber 2. As a result, since less of the weak line light 11B returns to the laser chamber 2, the rear slit 17 is not needed.

What is claimed is:

1. A fluorine laser device including a laser chamber in which a laser medium including fluorine is contained and is excited to thereby oscillate laser light, a front slit disposed in front of said laser chamber and having a front opening for transmitting the laser light, and a rear slit disposed behind said laser chamber and having a rear opening for transmitting the laser light, wherein at least one of said front slit and said rear slit is a slit in which black nickel plating is applied onto a surface at a laser chamber side.

* * * * *